United States Patent [19]
Ueno et al.
[11] Patent Number: 4,959,266
[45] Date of Patent: Sep. 25, 1990

[54] URETHANE-RESIN COATED ELECTRICAL WIRE HAVING AN INTERMEDIATE LAYER

[75] Inventors: Keiji Ueno, Osaka; Ikujiro Uda, Tochigi, both of Japan

[73] Assignee: Sumitomo Electric Industries, Ltd., Osaka, Japan

[21] Appl. No.: 898,167

[22] Filed: Aug. 18, 1986

[30] Foreign Application Priority Data

Aug. 23, 1985 [JP] Japan .......................... 60-129446[U]

[51] Int. Cl.[5] .............................................. B32B 27/00

[52] U.S. Cl. ................................ 428/383; 174/113 R; 174/120 SR; 428/379; 428/378; 428/389

[58] Field of Search ..................... 428/379, 383, 423.1, 428/424.2, 424.4, 424.6, 424.8, 377, 389, 375, 378, 372; 174/110 F, 120 SR, 113 R

[56] References Cited

U.S. PATENT DOCUMENTS

| | | | |
|---|---|---|---|
| 2,929,744 | 3/1960 | Mathes et al. | 428/383 |
| 3,502,791 | 3/1970 | Dahlstrom | 174/113 R |
| 3,857,996 | 12/1974 | Hansen et al. | 174/120 SR X |
| 4,116,786 | 9/1978 | Hodakowski | 427/54 |
| 4,254,230 | 3/1981 | Howard | 525/28 |
| 4,324,837 | 4/1982 | Miyake | 428/383 X |
| 4,397,974 | 8/1983 | Goyert et al. | 524/143 |

*Primary Examiner*—Lorraine T. Kendell
*Attorney, Agent, or Firm*—Sughrue, Mion, Zinn, Macpeak & Seas

[57] ABSTRACT

An electrical wire in which a core of stranded, insulated conductors is first coated with a thermoplastic resin layer having of melt index of at least 0.2 and then extrusion coated with a urethane resin layer. The urethane resin layer may be radiation cured.

6 Claims, 1 Drawing Sheet

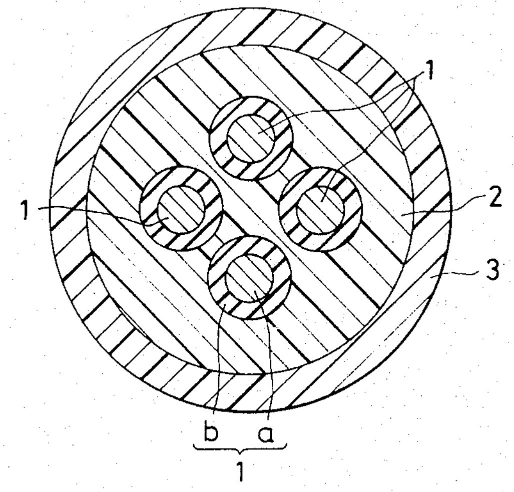
1
1
2
3
b
a
1

URETHANE-RESIN COATED ELECTRICAL WIRE HAVING AN INTERMEDIATE LAYER

BACKGROUND OF THE INVENTION

1. Field of the Invention

The present invention relates to a urethaneresin coated electrical wire. More particularly, the present invention relates to an electrical wire with a urethane resin coating layer that can be easily applied by extrusion coating and which provides for great ease in the circuit wiring with such a wire.

2. Background Art

Urethane resins have superior properties such as high mechanical strength, wear resistance and flexibility, and hence are extensively used as coating materials for various kinds of lead wires. However, urethane resins display elastomeric properties even when they are being extruded, so if they are used as coating materials for a multi-conductor electric wire composed of a stranded core of two or more twisted insulated conductors, the pressure exerted by the resin being extruded will cause the insulation coat on each conductor to deform. The tendency of the insulation coat to deform is particularly great at the interface between two adjacent turns of a conductor. If the extrusion conditions are extreme, the twisted conductors may be short-circuited as a result of deformation of the insulation coating.

In addition, urethane resins which have high mechanical strength and adhere strongly to other resins are very difficult to strip in the operations of the end-use preparation of the wire. The conventional method of stripping the jacket of urethane resin by cutting with a hot wire is cumbersome and a need exists for using a jacket system that is highly amenable to operations associated with its final preparation.

SUMMARY OF THE INVENTION

The present invention has been accomplished in order to solve the aforementioned problems of the prior art.

Therefore, an object of the invention is to provide an electrical wire with a urethane coating layer that can be applied without causing deformation of the insulation coating on conductors.

A further object is to provide a wire with easy use characteristics.

The urethane-resin coated electrical wire of the present invention has been conceived with a view to attaining this object. It is a multi-conductor wire formed of a stranded core of two or more insulated conductors and is covered with a thermoplastic resin coating layer and an extrusion-coated urethane resin coating layer. The first coating is layer made of a thermoplastic resin having a melt index of 0.2 or more and it underlies the urethane resin coating layer.

The thermoplastic resin forming the coating layer formed between the strands of insulated conductors and the urethane resin coating layer is required to have a melt index of 0.2 or more. If the melt index of this thermoplastic resin is less than 0.2, it may cause deformation of the insulation coat on conductors while it is being extruded over the strand of insulated conductors.

The urethane resin coating layer formed over the thermoplastic resin coating layer may be crosslinked by exposure to radiation.

BRIEF DESCRIPTION OF THE DRAWINGS

The accompanying drawing is a schematic cross-sectional view of a urethane-resin coated electrical wire in accordance with one embodiment of the present invention.

DETAILED DESCRIPTION OF THE PREFERRED EMBODIMENTS

The electrical wire of the present invention has an outer urethane resin coating layer formed over an inner thermoplastic resin coating layer which is provided around the stranded core of two or more insulated conductors. Because of this arrangement, the urethane resin layer can be formed by extrusion coating without causing the insulation coating on conductors to be deformed by the pressure of the urethane resin.

In addition, the thermoplastic resin of which the underlying coating layer is made has a melt index of 0.2 or more so that a coating of that thermoplastic resin can be formed without causing deformation of the insulation coat on the conductors.

The inner thermoplastic resin coating layer provided between the insulation coat on the conductors and the urethane resin coating layer prevents the urethane resin coat from adhering to the insulation coat, so that the jacket of urethane resin coating can be readily stripped as required in the operations of final end preparation.

The outer urethane resin coating layer may be crosslinked by exposure to radiation and this is effective not only for enhancing the mechanical strength of the urethane resin coating layer but also for eliminating the great inherent tendency of the urethane resin to hydrolyze.

A specific embodiment of the present invention is hereunder described with reference to the accompanying drawing, which is a schematic cross-sectional view of a urethane-resin coated electrical wire according to the one embodiment of the present invention. In this embodiment, there are four insulated conductors 1, each consisting of a conductor a that is made of an electrically conductive material such as copper and which is surrounded by an insulation coating b. The so coated conductors are twisted to form a stranded core which is then coated with an inner layer 2 that is formed of a thermoplastic resin having a melt index of 0.2 or more. Then the inner layer 2 is coated with an extrusion-coated urethane resin layer 3.

The melt index is an index defining the fluidity of a thermoplastic resin in its molten state and is defined by both JIS and ASTM standards. However, the JIS standard is the particular standard used to define the invention. A large melt index implies high fluidity and workability. The melt index is defined by, for example, JIS K6730 which is approximately the same as ASTM D1238.

There is no particular limitation on the shape of the conductors a or on the thickness of each of the resin layers 2 and 3. The proper choice of these parameters depends on the specific use of the resulting wire.

The insulation coat b may be formed of, for example, polyethylene, an ethylene-vinyl acetate copolymer, or polyvinyl chloride.

The inner thermoplastic resin layer 2 may be formed of, for example, polyethylene, an ethylene-vinyl acetate copolymer, an ethylene-ethylacrylate copolymer, an ethylene- -olefin copolymer, or an EPDM (ethylene-propylene-diene methylene linkage) rubber.

The outer urethane resin layer 3 may be formed of, for example, a caprolactam-based urethane elastomer or an ether-based urethane elastomer.

The urethane-resin coated electrical wire of the present invention in accordance with the embodiment shown in the accompanying drawing may be fabricated by the following procedure. A stranded core of insulated conductors is coated with a thermoplastic resin having a melt index of 0.2 or more by extrusion or any other conventional coating techniques, so as to form a thermoplastic resin coating layer. The inner thermoplastic layer 2 is then overlaid with a urethane resin coating layer 3 formed by extrusion coating.

The thus formed urethane resin coating layer 3 may be crosslinked by exposure to radiation so as to be provided with improved mechanical strength and resistance to hydrolysis. Radiations that may be employed include electron beams, X-rays, alpha-rays, beta-rays and gamma-rays. For industrial applications, electron beams are advantageously used from the viewpoints of penetrating energy and dose rate. However cross-linking is not absolutely necessary in the invention. If crosslinking is contemplated, a polyfunctional monomer is used.

If the electrical wire of the present invention is intended for use in applications such as soldering where it is exposed to temperatures of, say, 150° C. or higher, or if it is to be used in such applications as electronically numerically controlled machine tools where high wear resistance and mechanical strength are required, the urethane resin coating layer may be formed of a urethane resin composition having the following components:

(a) a thermoplastic urethane resin; and (b) a polyfunctional monomer selected from the group consisting of trimethylolpropane triacrylate, trimethylolpropane trimethacrylate, and triacrylformal.

It is particularly preferable that the content of the poly-functional monomer in the above urethane resin composition is within the range of from 0.1 part by weight to 50 parts by weight for 100 parts by weight of the thermoplastic urethane resin. If the content of the polyfunctional monomer is 0.1 part by weight or more, crosslinking by exposure to radiation can be achieved to such an extent that the electrical wire with the urethane resin coat will satisfactorily withstand use in application that require high beat resistance. If the content of the polyfunctional monomer is not more than 50 parts by weight, the electrical wire will display mechanical strength that is great enough to warrant its use in applications where high mechanical strength is required.

If the electrical wire of the present invention is intended for use in applications where temperatures of, say, 180° C. or higher will prevail or where flame retardancy is required for the purpose of preventing fires and other mishaps, the urethane resin coat may be formed of a urethane resin composition which, in addition to the thermoplastic urethane resin and polyfunctional monomer shown above, contains the following components:

(c) decabromodiphenyl ether; and (d) antimony trioxide.

The urethane-resin coated electrical wire of the present invention is not limited to the embodiment shown above and many modifications are possible without departing from the scope of the invention. Examples of such modifications are changing the number of insulated conductors which are to be twisted in the stranded core and incorporating an appropriate filler or colorant in the urethane resin coating layer.

An example of the method for producing the urethane-resin coated electrical wire of the present invention is hereunder described but the example should in no sense be taken to limit the invention.

EXAMPLE

Four insulated conductors each consisting of a copper wire (0.5 mm in diameter) having a polyvinyl chloride insulation coating (0.75 mm thick) were twisted together in a stranded core. Polyethylene (with a melt index of 5) was extruded over the core to form a polyethylene coating 0.5 mm thick. A urethane resin was extruded over the polyethylene coat to a thickness of 1.5 mm. The so formed urethane resin coat was crosslinked by exposure to electron beams (of 2 MeV in energy) for a total dose of 10 Mrad. The urethane resin included 100 parts by weight of Elastolan E 385, and 5 parts by weight of trimethylolpropane trimethacrylate as a polyfunctional monomer.

The resulting electrical wire with the crosslinked urethane coating layer was free from any deformation of the insulation coat on the conductors and the urethane resin jacket could be readily stripped by routine procedures in end preparation of the wire.

As described in the foregoing pages, the urethane-resin coated electrical wire of the present invention offers the practical advantages that the urethane resin coat can be formed without causing deformation of the insulation coat on the conductors. Furthermore, the urethane resin coat can be easily stripped by routine procedures for end preparation without employing any special tool.

What is claimed is:

1. An electrical wire, comprising:

a stranded core of two or more twisted conductors, each conductor being surrounded by a respective insulation layer;

a thermoplastic resin coating layer covering said stranded core and comprising a thermoplastic resin having a melt index of 0.2 or greater; and an extrusion-coated urethane resin coating layer covering said thermoplastic resin coating layer, wherein said urethane resin coating layer is made of a composition comprising a thermoplastic urethane resin and a polyfunctional monomer selected from the group consisting of trimethylolpropane triacrylate, trimethylolpropane trimethacrylate and triacrylformal and is crosslinked by radiation.

2. An electrical wire as recited in claim 1, wherein said radiation crosslinked thermoplastic resin is an electron crosslinked thermoplastic resin.

3. An electrical wire as recited in claim 1, wherein said composition comprises said polyfunctional monomer in an amount of 0.1 to 50 parts by weight and said thermoplastic urethane resin in an amount of 100 parts by weight.

4. An electrical wire as recited in claim 1, wherein said composition further comprises decabromodiphenyl ether and antimony trioxide.

5. An electrical wire as recited in claim 3, wherein said composition further comprises decabromodiphenyl ether and antimony trioxide.

6. An electrical wire as recited in claim 1, wherein said melt index is not greater than 50.

* * * * *